Feb. 23, 1954
W. P. STAHLE
2,670,111
FISHING ROD HOLDER
Filed July 26, 1950
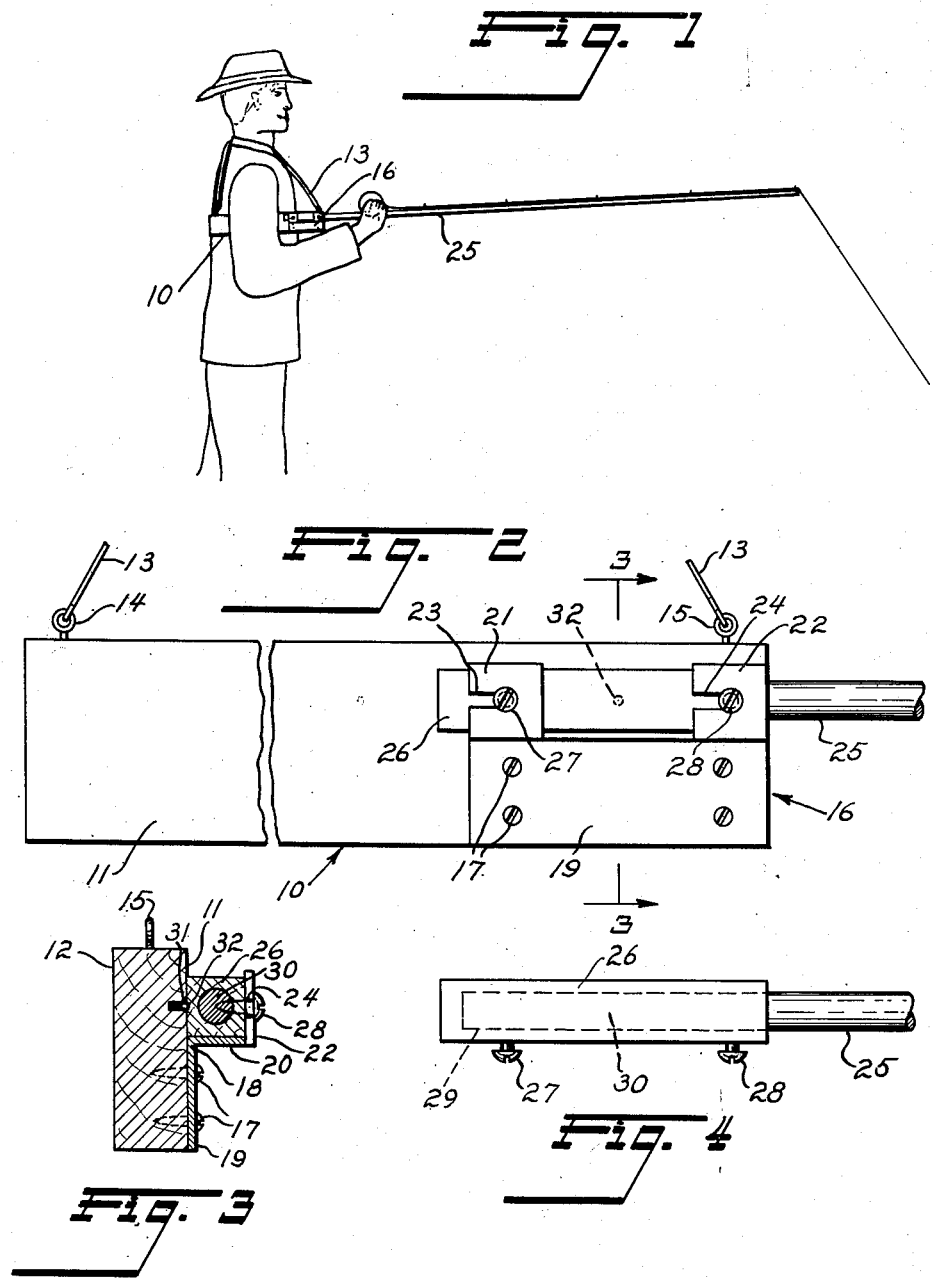
INVENTOR
WILLIAM P. STAHLE
BY *Hutchinson & Hutchinson*
ATTORNEYS Patented Feb. 23, 1954

2,670,111

UNITED STATES PATENT OFFICE 2,670,111

FISHING ROD HOLDER

William P. Stahle, Newport News, Va.

Application July 26, 1950, Serial No. 175,988

9 Claims. (Cl. 224—5)

1

This invention relates to improvements in fishing rod holders and more particularly to such holders which are adapted to support a fishing rod from the body of a fisherman and which will permit all normal movements and operations of the rod and attached reel to be performed solely by the use of one arm of the fisherman.

While various fishing rod holders have heretofore been devised for supporting fishing rods in part from the body of a fisherman, so far as applicant is aware, none of these has ever afforded complete support for the rod in such a manner as to completely eliminate the necessity for using the hands of the fisherman in supporting the rod after the rod has been placed in the holder. Since at least one hand had to be used in partially supporting the rod in these prior art devices said devices were incapable of permitting a fisherman having only one arm from completely enjoying all the pleasures of performing unassisted the normal operations incident to the act of fishing, such as casting, supporting the rod, operation of the reel while supporting the rod, and removal of the fish from the water.

It is therefore a primary object of the invention to provide means for detachably supporting a fishing rod and reel from the body of the fisherman in a manner to permit the fisherman to perform all normal fishing operations by the use of only one arm.

Another object of the invention is to provide a fishing rod holder which, after the rod has been inserted in the holder, will permit the fisherman to completely support the rod and reel without the use of his hands.

A further object of the invention is to provide a fishing rod supporting means which will permit total support of the rod by the fisherman's body and while so supported will permit the fisherman to use his hands for tasks other than supporting the rod, such as operation of the reel, lifting fish out of the water, etc.

To the accomplishment of the above and related objects, as will appear as the description proceeds, the invention may be embodied in the forms illustrated in the accompanying drawings, attention being called to the fact, however, that the drawings are illustrative only, and that changes may be made in the specific constructions illustrated and described, so long as the scope of the appended claims is not violated.

In the accompanying drawings which form a part of this application,

Figure 1 is a perspective view of the fishing rod holder in use by a fisherman and showing

2 the manner in which it is positioned and held during the act of fishing.

Figure 2 is an enlarged side elevation of the rod supporting member and socket with the butt end of the fishing rod secured in said socket and with the rod and harness broken away for convenience.

Figure 3 is a sectional view of the rod supporting member, socket and butt end of the fishing rod taken on the line 3—3 of Figure 2.

Figure 4 is a top plan view of the butt end of the fishing rod with the rod broken away for convenience.

Like characters of reference are used throughout the following specification and the accompanying drawings to designate corresponding parts.

In carrying out the invention there is provided a fishing rod supporting member 10 preferably of substantially rectangular configuration and in any event formed with substantially opposed flat surfaces 11 and 12 for positioning under the arm of a fisherman and in the general vicinity of the armpit, the same being so positioned and supported on the body of the fisherman by a supporting shoulder harness or sling 13 which is attached to the supporting member by suitable means such as eyebolts 14 and 15 at each end thereof. The sling 13 when placed over the head is adjusted or formed of such a length as to properly support the rod supporting member 10 in the desired position beneath the armpit of the fisherman so that member 10 may be securely and physically clamped between the body of the fisherman and the upper portion of his arm as will be readily understood from reference to Fig. 1 of the accompanying drawings.

It should here be noted that the rod supporting member 10 need not be of rectangular configuration so long as it serves its intended purpose and is capable of being easily and comfortably held between the arm and body of the fisherman. The said member may be constructed of any suitable lightweight material such as wood, aluminum, magnesium and the like. The embodiment shown in the drawings is formed of wood and is preferably made rectangular in configuration for convenience in manufacture. It has been found that a rod supporting member of a thickness of 1", a width of 2.75" and a length of 15" is quite satisfactory in use although these dimensions are not believed critical.

The rod supporting member 10 carries a socket member 16 at the forward end thereof, that is, at the end of the member 10 which projects in front of the fisherman's body, and preferably on the flat side 11 of said member 10. This socket member may be formed integral with the rod supporting member, if desired, but as shown in the preferred embodiment of the invention comprises a metallic plate shaped to form a socket with the flat side 11 of member 10, which plate is secured to the member 10 by suitable screws or the like 17. As best seen in Fig. 3, the plate is angularly bent or formed at 18 to provide a base supporting portion 19 for attachment to the member 10 and a socket seat portion 20 extending at right angles from the portion 19, which socket seat portion has additionally formed thereon and at right angles thereto upstanding ears 21 and 22. The socket for the butt end of the fishing rod is thus formed by surface 11 of the member 10, the portion 20 of the plate 16 and the upstanding spaced ears 21 and 22. Ears 21 and 22 are each provided with slots 23—24 which extend forwardly from the rear edges of the ears and which are adapted to receive pin-like elements carried by the butt end of the fishing rod and prevent forward removal of the rod from the socket as will be explained later.

The fishing rod 25 has its butt end provided with an enlarged portion 26 of a size and configuration to fit the shape of the socket member 16 and to be easily insertable therein. Since the socket shown in the drawings is of substantially square configuration, the portion 26 has been formed square in cross-section to cooperate therewith. It will be understood of course that any other cross-sectional configuration of socket and cooperating butt end portion 26 may be used although it is preferable to have at least one flat surface on each of the two members, which flat surfaces will cooperate in preventing rotation of the rod in the socket and with reference to the rod supporting member 10.

The butt end portion 26 is provided with two headed pin-like elements 27—28 which may take the form of screws, rivets or the like. The pin-like elements 27—28 are positioned on the portion 26 so that when the butt end portion is placed in the socket and moved forward therein the pins will each enter the respective slots 23—24 in the ears 21—22 and thus lock the portion 26 and rod in the socket against forward withdrawal of the same. By virtue of this construction a tug or pull on the fishing line will not dislodge the rod from the holder but will only tend to seat and lock the butt end of the rod more firmly in the socket. To remove the butt end portion 26 and rod from the socket it is first necessary to move the rod and the portion 26 carried thereby rearwardly far enough for the pin-like elements 27—28 to clear the slots 23—24 after which the rod may be lifted out of the socket, as will be readily understood.

While the butt-end portion 26 may be formed as an integral part of the rod in the manufacture thereof, the illustration given in the drawing shows the same as an attachment for a conventional rod. The attachment is provided with a suitable bore 29 for receiving the end of a conventional rod or rod section 30. The pin-like elements 27—28 may conveniently be in the form of screws which not only perform their locking duties with respect to the slots 23—24, as heretofore recited, but also retain the attachment on the rod as will be clearly understood by referring to Fig. 3 of the drawings.

Means are also provided for preventing the accidental dislodgement of the rod from the socket. This means preferably takes the form of a spring pressed ball detent 31 carried in the side surface 11 of the supporting member midway between the ears 21 and 22, which ball detent will be urged into frictional contact with the adjacent side surface of the butt end portion 26 and is adapted to snap into a depression 32 therein when the portion 26 is in properly seated position in the socket. The ball detent and cooperating depression will retain the rod in the holder and keep it from being accidentally moved rearwardly under normal usage while at the same time permitting the parts to be so moved by hand when the butt end of the rod is being inserted into and removed from the socket.

Assuming that the fisherman desired to fish with his right arm and hand as illustrated in Fig. 1 of the drawings, he first places the sling or harness 13 over his head to the left side thereof and adjusts the sling and rod supporting member 10 so that the latter is comfortably placed in proper position beneath the right armpit with the socket means positioned in front of his body and to the outside thereof as shown in the drawings. The rod is grasped in the right hand and a cast is made after which the butt end portion 26 of the rod is placed into the socket 16 by the right hand with the pins 27—28 to the rear of the ears 21—22. The fisherman then pulls the rod forward slightly until the pins enter their respective locking slots and the spring pressed ball detent 31 snaps into the depression 32. The rod is now locked securely in the socket 16 and the fisherman can comfortably support the entire rod and reel by physically clamping the rod supporting member 10 between the right side of his body and the inside of the upper portion of his right arm. By thus supporting the rod, the fisherman may have free use of the forearm and hand of the right arm while still maintaining adequate physical clamping pressure with the upper part of the same arm. The right hand may be easily used to efficiently operate the reel in conventional fashion to reel in the line and to let it play out as the case may require.

Whenever the fisherman desires to remove the rod from the holder he merely gives the rod a firm backward movement in the socket sufficient to unseat the ball detent from the depression 32 and to permit the pins to clear the slots 23—24 after which he may easily lift the rod out of the socket all by the use of his right hand.

By virtue of the invention heretofore described, it will be seen that the fisherman can perform all normal fishing operations by the use of only one arm. Consequently such a construction will not only permit fishermen having only one arm to fish without assistance, but said construction will be found to be of decided advantage to fishermen having both arms, since it permits such fishermen to leave one arm and hand completely free to operate an outboard motor, steer a boat, or for performing any other incidental chore so desired while at the same time having complete support and control of the rod and line with the other arm and hand.

Having described my invention, what I claim is:

1. A fishing rod holder for supporting a fishing rod and reel from the body of a fisherman to permit normal manipulation of the rod and reel by the use of one arm only of the fisherman, comprising a rod supporting member having oppositely disposed body engaging surfaces, a harness for supporting the rod supporting member from the fisherman's shoulder and for positioning said member beneath one of the fisherman's armpits so that the said member may be securely and physically clamped between the body and the upper portion of the fisherman's arm, by physical contact of the body and arm of the fisherman with said surfaces, socket means carried by the rod supporting member, means carried by the butt end of a fishing rod for insertion in said socket means and cooperating therewith to securely and detachably engage and retain the butt end of the fishing rod to said rod supporting member, said socket means having a lateral entrance thereto for receiving by a sidewise insertion said means carried by the butt end of the fishing rod, and said socket means and said means carried by the butt end of the fishing rod including means for preventing withdrawal of the last mentioned means from the socket means in a forwardly direction but permitting withdrawal therefrom in a rearwardly direction, whereby the rod after casting may have the butt end thereof inserted in said socket means by the use of one hand only and after so inserted be totally supported by the rod supporting member without the use of the hands of the fisherman and thus permit free operation of the reel by the hand of the arm which is physically clamping the rod supporting member against the fisherman's body.

2. The subject matter of claim 1 wherein the means for preventing the forward withdrawal of the rod from the socket means comprises a cooperating pin and slot connection between the respective parts.

3. The subject matter of claim 2 and spring pressed means for frictionally engaging the butt end of the fishing rod and preventing accidental rearward removal of the rod from the socket means.

4. The subject matter of claim 1 wherein said socket means and said means carried by the butt end of the fishing rod are each provided with cooperating surfaces preventing rotation of the rod with respect to said socket.

5. The subject matter of claim 4 wherein said cooperating surfaces comprise at least one flat surface in the socket means and at least one cooperating flat surface on the means carried by the butt end of the fishing rod.

6. The subject matter of claim 4 wherein said socket means and said means carried by the butt end of the fishing rod include cooperating guide surfaces that facilitate the positioning of the butt end of the fishing rod in the socket means.

7. The subject matter of claim 5 and spring pressed means for frictionally engaging the butt end of the fishing rod and preventing accidental removal of the rod from the socket means.

8. A fishing rod holder for supporting a fishing rod and reel from the body of a fisherman to permit normal manipulation of the rod and reel by the use of one arm only of the fisherman, comprising, a rod supporting member, a harness for supporting the rod supporting member from the fisherman's shoulder and for positioning said member beneath one of the fisherman's armpits so that the said member may be securely and physically clamped between the body and the upper portion of the fisherman's arm, socket means carried by the rod supporting member, means carried by the butt end of a fishing rod for insertion in said socket means and cooperating therewith to securely and detachably engage and retain the butt end of the fishing rod to said rod supporting member, said cooperating socket means and means carried by the butt end of the rod each including cooperating surfaces for preventing rotation of the rod with respect to said socket means, a pin carried by one of said cooperating surfaces and a slot formed in the other of said cooperating surfaces, which pin on entering said slot on the insertion of the butt end of the rod in the socket means will lock the rod against forward withdrawal from the socket but permit the parts to be separated by rearward movement of the rod with respect to the socket means.

9. The subject matter of claim 8 and spring pressed means carried by the socket means for frictionally engaging the butt end of the fishing rod and preventing accidental rearward removal of the rod from the socket means.

WILLIAM P. STAHLE.

References Cited in the file of this patent

UNITED STATES PATENTS

| Number | Name | Date |
|---|---|---|
| 175,903 | Batley | Apr. 11, 1876 |
| 278,124 | Gause | May 22, 1883 |
| 371,777 | McCabe | Oct. 18, 1887 |
| 435,446 | Pattee | Sept. 2, 1890 |
| 517,555 | Reed | Apr. 3, 1894 |
| 1,282,039 | Bullock et al. | Oct. 22, 1918 |
| 1,761,497 | Smith | June 3, 1930 |
| 1,985,985 | Gerline | Jan. 1, 1935 |
| 2,085,984 | Kruithof | July 6, 1937 |
| 2,292,142 | Matson | Aug. 4, 1942 |
| 2,298,694 | Haislip | Oct. 13, 1942 |
| 2,537,456 | Goss | Jan. 9, 1951 |